(12) United States Patent
Bauer

(10) Patent No.: US 12,350,527 B2
(45) Date of Patent: Jul. 8, 2025

(54) BRAKE PLATE FOR A ROPE GRAB FOR ROPE CLIMBING, ROPE GRAB FOR ROPE CLIMBING, AND METHOD FOR RETROFITTING A ROPE GRAB

(71) Applicant: BAUERandMORE GmbH, Pfungstadt (DE)

(72) Inventor: Matthias N. Bauer, Pfungstadt (DE)

(73) Assignee: BAUERandMORE GmbH, Pfungstadt (DE)

( * ) Notice: Subject to any disclaimer, the term of this patent is extended or adjusted under 35 U.S.C. 154(b) by 573 days.

(21) Appl. No.: 17/779,603

(22) PCT Filed: Dec. 10, 2020

(86) PCT No.: PCT/EP2020/085412
§ 371 (c)(1),
(2) Date: Oct. 19, 2022

(87) PCT Pub. No.: WO2021/116242
PCT Pub. Date: Jun. 17, 2021

(65) Prior Publication Data
US 2023/0056795 A1    Feb. 23, 2023

(30) Foreign Application Priority Data
Dec. 11, 2019   (EP) ..................................... 19215073

(51) Int. Cl.
*A62B 1/10*     (2006.01)
*A62B 35/00*    (2006.01)
*F16D 63/00*    (2006.01)

(52) U.S. Cl.
CPC ............ *A62B 1/10* (2013.01); *A62B 35/0068* (2013.01); *F16D 63/008* (2013.01)

(58) Field of Classification Search
CPC ....... F16D 63/008; F16G 11/103; A62B 1/10; A62B 1/14; A62B 35/0043; A62B 35/0068

(Continued)

(56) References Cited

U.S. PATENT DOCUMENTS 5,360,083 A * 11/1994 Hede ........................ A62B 1/14
                                                     182/5
5,577,576 A * 11/1996 Petzl ........................ A62B 1/14
                                                     188/65.4

(Continued)

FOREIGN PATENT DOCUMENTS

DE        2439637 A1    3/1976
GB        2293193 A  *  3/1996   ............... A62B 1/14

(Continued)

*Primary Examiner* — Robert A. Siconolfi
*Assistant Examiner* — San M Aung
(74) *Attorney, Agent, or Firm* — Young Basile Hanlon & MacFarlane, P.C.

(57) ABSTRACT

The invention relates to a brake plate for a rope grab for rope climbing, comprising: a first section for supporting a rope on the brake plate, said first section being a first arc of a first circle with a first radius, and a second section for supporting the rope on the brake plate, said second section being arranged adjacently to the first section, wherein the brake plate is characterized in that the second section is a second arc of a second circle with a second radius, and the second radius is larger than the first radius. The invention additionally relates to a rope grab for rope climbing, comprising the brake plate, and to a method for retrofitting a rope grab with the brake plate.

11 Claims, 6 Drawing Sheets

(58) Field of Classification Search
USPC .......................................................... 188/65.4
See application file for complete search history.

(56) References Cited

U.S. PATENT DOCUMENTS

| | | | | |
|---|---|---|---|---|
| 8,584,814 | B2 * | 11/2013 | Chaumontet | ............ A62B 1/14 188/65.1 |
| 2009/0000879 | A1 * | 1/2009 | Kowatsch | ................ A62B 1/10 188/65.4 |
| 2012/0261212 | A1 * | 10/2012 | Bonaiti | .................... A62B 1/14 182/5 |
| 2014/0020988 | A1 | 1/2014 | Casebolt et al. | |

FOREIGN PATENT DOCUMENTS

| | | | | | |
|---|---|---|---|---|---|
| GB | 2431456 | A | * | 4/2007 | ............... A62B 1/14 |
| GB | 2438018 | A | * | 11/2007 | ............... A62B 1/14 |
| GB | 2441140 | A | * | 2/2008 | ............... A62B 1/14 |
| JP | S4925798 | A | | 3/1974 | |
| WO | 2010141988 | A1 | | 12/2010 | |
| WO | WO-2015074105 | A1 | * | 5/2015 | ............... A62B 1/14 |

* cited by examiner

Fig. 1A: Rest position
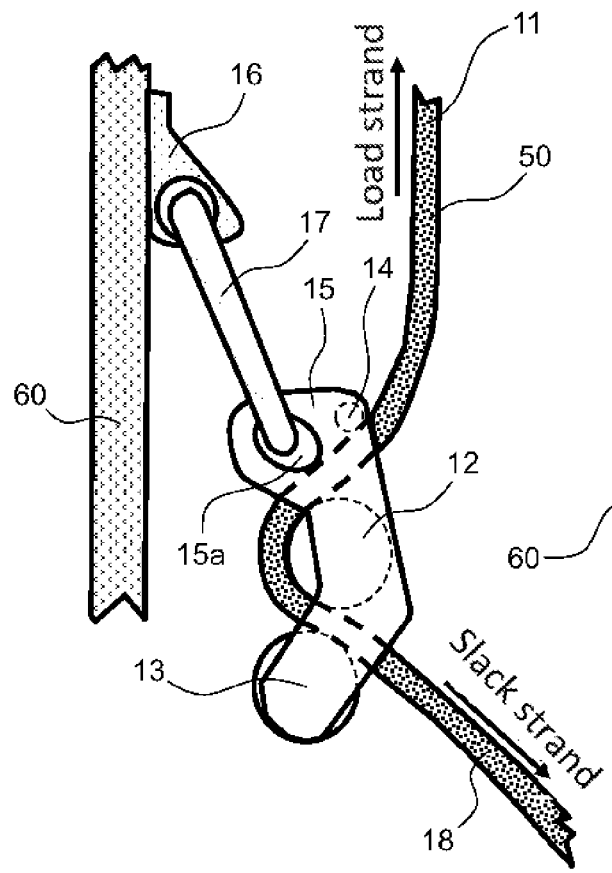
Fig. 1C: Work position 2
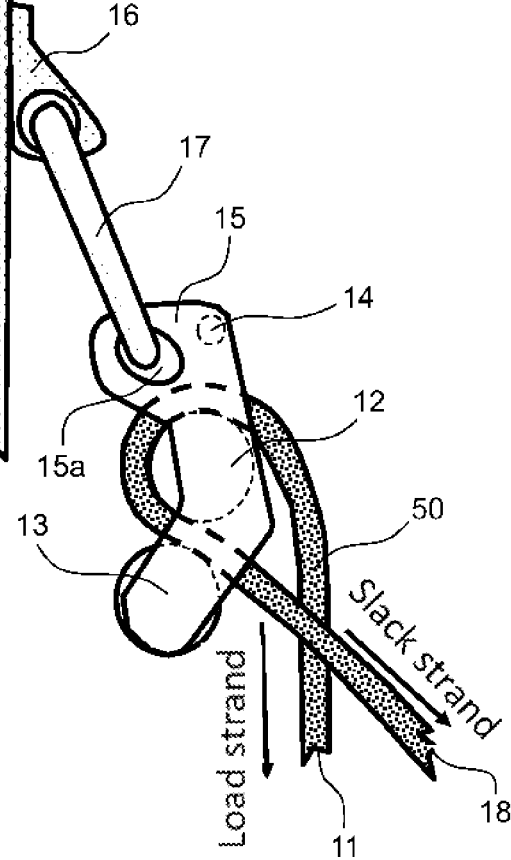
Fig. 1B: Work position 1
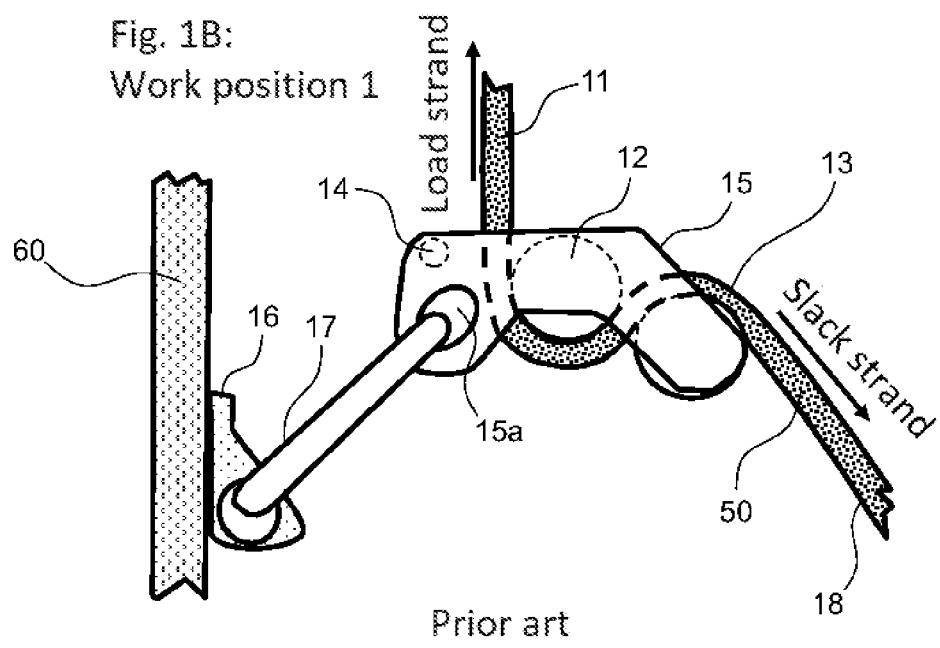
Prior art

BRAKE PLATE FOR A ROPE GRAB FOR ROPE CLIMBING, ROPE GRAB FOR ROPE CLIMBING, AND METHOD FOR RETROFITTING A ROPE GRAB

CROSS REFERENCE TO RELATED APPLICATION(S)

This application claims priority to International Patent Application No. PCT/EP2020/085412, filed Dec. 10, 2020, and European Patent Application Serial No. 19215073.8, filed Dec. 11, 2019, the entire disclosures both of which are hereby incorporated by reference.

TECHNICAL FIELD

The invention described herein relates to a brake plate for a rope grab for rope climbing. Furthermore, the invention relates to a rope grab for rope climbing comprising the brake plate, and to a method for retrofitting a rope grab with the brake plate.

BACKGROUND

A rope grab known from the prior art is shown in FIGS. 1A to 1C. This prior art rope grab has a circular brake plate 12 and a circular control plate 13 along which or around which the rope 50 passes through the rope grab. The brake plate 12 and the control plate 13 thus each have the contour or outline of a circle. The rope 50 has a first rope end 18, which is secured to the belayer who normally stands on the ground. The rope 50 further has a second rope end 11 which is secured to the climber. The second rope end 11 is thus the rope end which is pulled and can be tautened and is therefore referred to as the load strand. The first rope end 18, on the other hand, is the loose, non-pulled, slack rope end and is therefore referred to as the slack strand. The rope grab further typically includes a safety pin 14 and a cheek 15 having an opening 15a for passing a carabiner 17 therethrough, wherein the carabiner 17 in turn is secured to a lug 16 secured to a (rock) wall 60. The rope grab is usually suspended from an intermediate belay.

In principle, this rope grab can be in three positions, namely the rest position shown in FIG. 1A and the work positions 1 and 2 shown in FIGS. 1A and 1B. In the rest position, the rope 50 runs through the rope grab without load and there is little friction on the brake plate 12 and the control plate 13. While in the work position 1, the rope 50 still runs through another carabiner located above the rope grab on the wall 60, this is not the case in the work position 2, and in the work position 2, the rope grab serves as a deflection means as shown in FIG. 1C.

A climber's fall in rope climbing can basically be divided into three phases. In the first phase, the climber loses his grip and begins to fall. The belayer possibly notices the fall of the climber and prepares for the impact force. In the second phase, the rope grab 50 tightens between the climber and the belayer and between the brake plate 12 and the control plate 13. The rope grab turns in between the brake plate 12 or control plate 13 and the rope 50 via the normal force (see FIG. 1B). The rope grab is pulled along until the intermediate belay, such as carabiner 17 and a lug 16, retains the rope grab. The belayer is slightly carried along by the kinematic energy from the climber, and the rope elongation serves as a damping means for the climber and belayer. This is the moment of the impact force. The belayer is accelerated to the speed of the falling climber. In the third phase, kinetic energy is converted via friction in the rope grab system into heat and possibly other forms of energy such as potential energy of the belayer, and the falling climber is decelerated.

Due to the rope grab turning from the rest position into the work position (see FIG. 1B), the slack rope is shortened. Through the tension from the rope, the rope grab is pulled into the work position and a portion of the impact force can already be decoupled from the rope in the form of friction via the rope grab. A portion of the forces acting in the rope 50 are decoupled via the friction of the rope grab until the system has come to a standstill.

However, it has been shown that certain greater weight differences between a heavy climber and a lighter belayer result in the fact that during a fall, a climber can be arrested by such rope grabs only with great difficulties.

SUMMARY

It is an object of invention to find means which make it possible that during rope climbing, climbers having an even greater mass in comparison to the belayer can be secured.

This object is achieved in that the brake plate according to the invention is used instead of the circular brake plate 12. The brake plate according to the invention can be used in a rope grab known in the prior art, such as the rope grab described in FIGS. 1A to 1C. Therefore, the object is achieved in each case by the brake plate according to the invention, the rope grab according to the invention and the method according to the invention.

The brake plate according to the invention for a rope grab for rope climbing comprises: a first section for supporting a rope on the brake plate, wherein the first section is a first arc of a first circle having a first radius; and a second section for supporting the rope on the brake plate, wherein the second portion is arranged adjacent the first portion; wherein the brake plate is characterized in that the second section is a second arc of a second circle having a second radius, wherein the second radius is greater than the first radius.

The rope grab for rope climbing according to the invention is characterized in that the rope grab comprises the brake plate according to the invention.

The method according to the invention is for retrofitting a rope grab, wherein the rope grab comprises a fastening means for a brake plate, the method comprising: fixing the brake plate according to the invention to the fastening means.

Accelerations acting on the belayer become smaller when the rope grab responds faster. By means of a lever arm, which is provided between the pivot point of the rope grab and the driven brake plate, a moment is built up that turns the rope grab into the rope course. This turn takes the slack rope out of the system and the wrap angles of the rope at the brake plate and the control disc increase (compare FIG. 1A with FIG. 1B, 1C). The larger this lever arm can be kept, the more the rope grab is pulled into the rope course. According to the brake plate according to the invention, the lever arm does not decrease so much or so fast during the turning of the rope brake compared to the circular brake plate 12 known from the prior art, so that the rope grab can be turned in faster and farther and the wrap angle of the rope around the brake plate and control plate increases, so that as a result, greater weights or weight differences can be arrested by the rope brake when the climber falls. Due to the brake plate according to the invention, more force is decoupled from the rope and less energy from the impact of the fall reaches the belayer, who is also less accelerated as a result. From the belayer's point of view, the fall is thus more controllable.

According to preferred embodiments of the brake plate according to the invention, the brake plate further has a third section for supporting the rope on the brake plate, wherein the third section is a third arc of a third circle having a third radius, wherein the third section is arranged adjacent to the first section, and wherein the third radius is smaller than the first radius, thereby further enhancing the positive effects described above.

According to preferred embodiments of the brake plate according to the invention, the second section is a section of the surface of the brake plate and has a rope channel with wavelike contour, whereby the rope adapts to the brake plate during the climber's fall and the friction values are additionally increased, in particular in the work position 2 (FIG. 1C).

These optional preferred features can be combined with each other. Further optional preferred features are described in the following part of the description, resulting in further advantages for the person skilled in the art.

BRIEF DESCRIPTION OF THE DRAWINGS

FIG. 1A shows the rest position of a rope grab known from the prior art;

FIG. 1B shows a first work position of the rope grab known from the prior art;

FIG. 1C shows a second work position of the rope grab known from the prior art;

Features with the same reference signs in FIGS. 1A to 6B are identical, so that the features described in the context of FIGS. 1A to 1C are equally applicable to FIGS. 2 to 6B, provided they are used there with the same reference signs.

DETAILED DESCRIPTION

Figure 2:
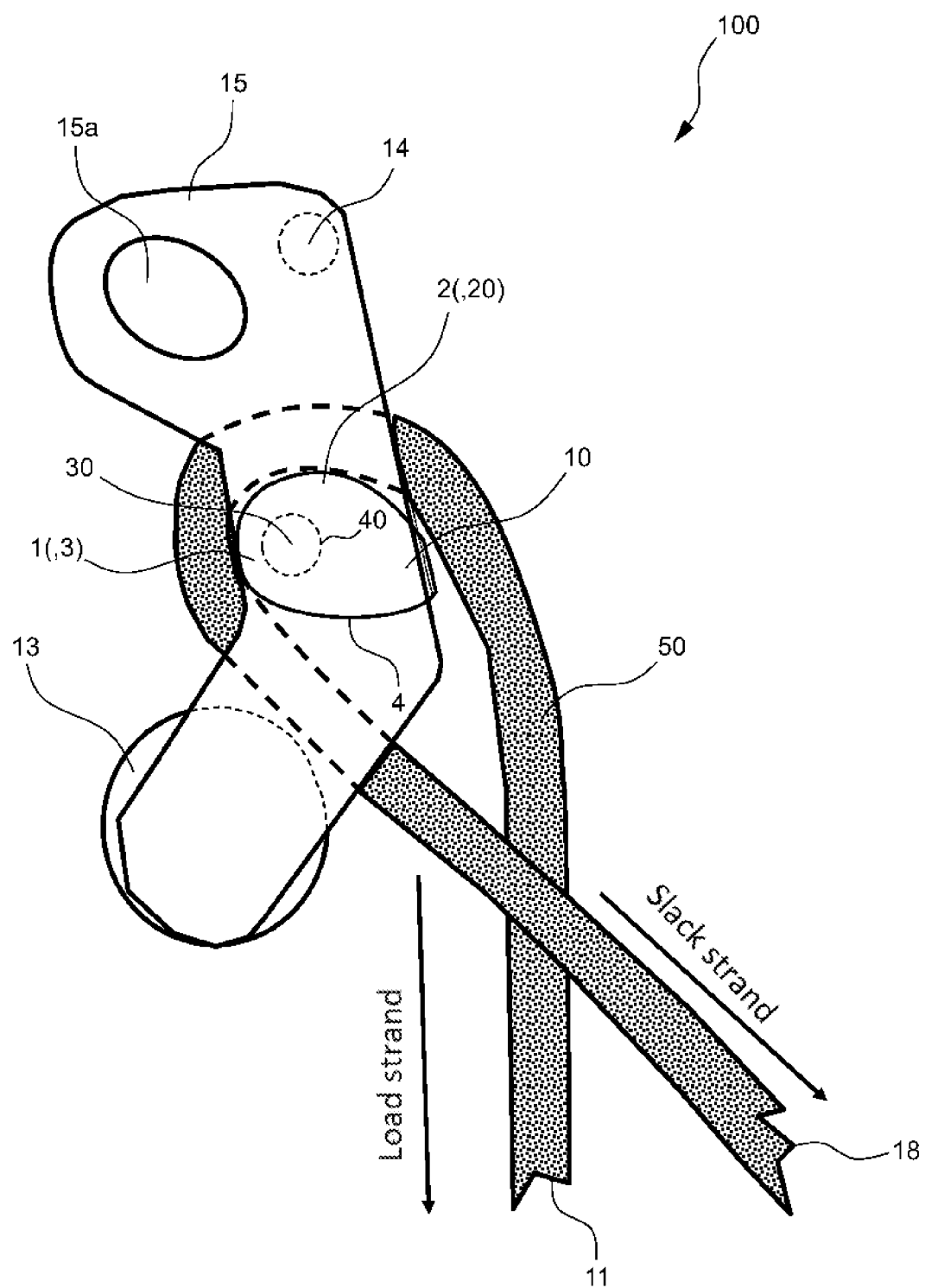
FIG. 2 shows the brake plate 10 according to the invention in a state in which it is installed in the rope grab 100 according to the invention and, as an example, is in the work position according to FIG. 1C.
Figure 3:
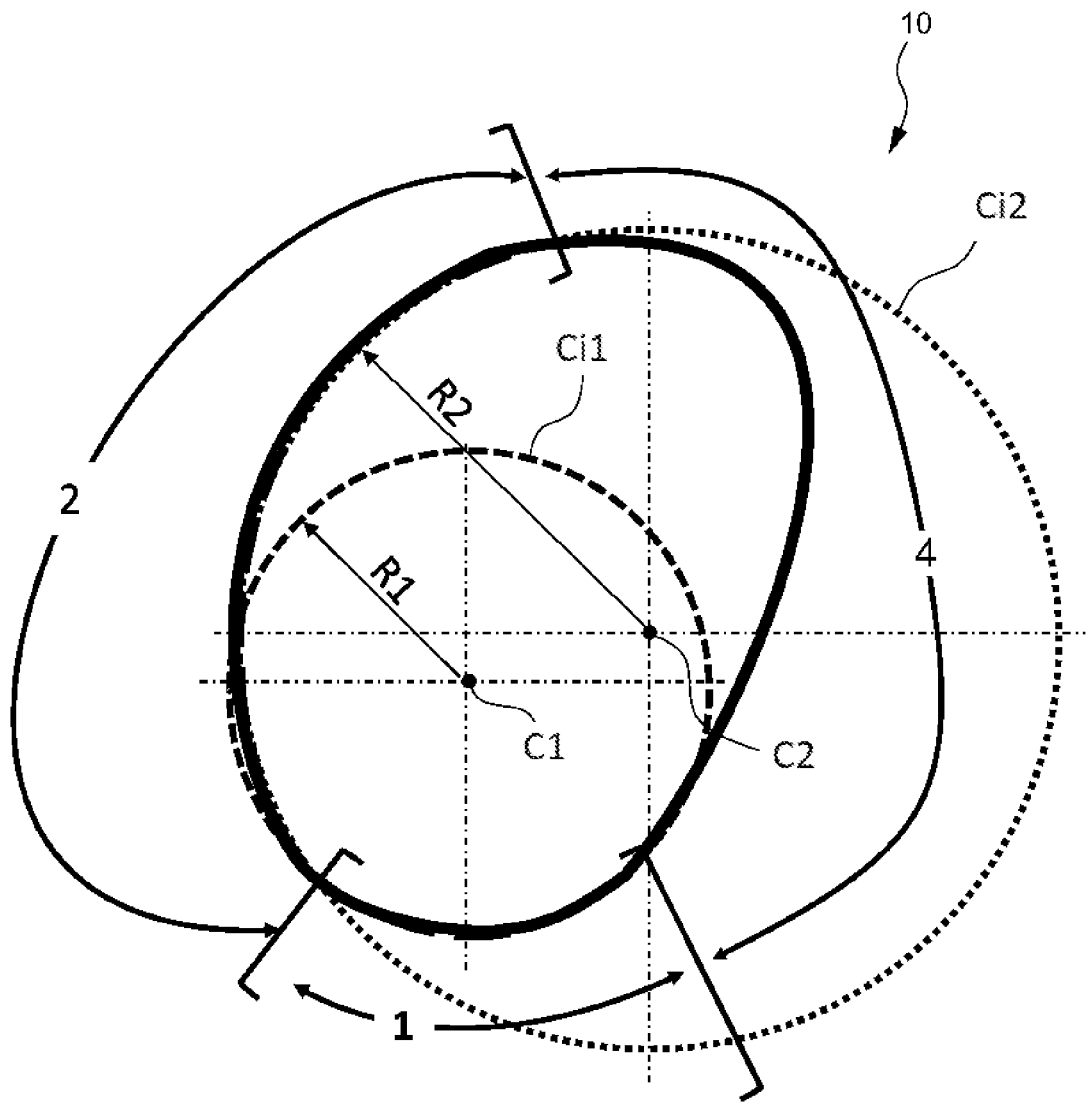
FIG. 3 shows the brake plate 10 according to the invention.

FIG. 3 shows the brake plate 10 according to the invention for a rope grab 100 for rope climbing. FIG. 2 shows the brake plate 10 according to the invention in a state in which it is installed in the rope grab 100 according to the invention and, as an example, is in the work position according to FIG. 1C.

The brake plate comprises: a first section 1 for supporting a rope 50 on the brake plate 10, wherein the first section 1 is a first arc of a first circle Ci1 having a first radius R1; and a second section 2 for supporting the rope 50 on the brake plate 10, wherein the second section 2 is arranged adjacent to the first section 1; wherein the brake plate 10 is characterized in that the second section 2 is a second arc of a second circle Ci2 having a second radius R2, wherein the second radius R2 is greater than the first radius R1, wherein preferably the ratio of the second radius to the first radius is (approximately) 1 to ½. "Adjacent" in the meaning of this application means having a common boundary or directly merging, abutting each other, or touching each other.

The first section 1 and the second section 2 can be sections of the surface of the brake plate 10, and the second section 2 can be located downstream of the first section 1 as viewed from the slack strand 18 of the rope to the load strand 11 of the rope. The second rope end 11 is the rope end that is pulled and can be tautened and is therefore referred to as the load strand. The first rope end 18, on the other hand, is the loose, non-pulled, slack strand end of the rope and is therefore referred to as the slack strand. The first rope end 18 can also be referred to as the rope 50 entering the rope grab 100 or brake plate 10, and the second rope end 11 can also be referred to as the rope 50 exiting the rope grab 100 or brake plate 10. The rope end 11 is for attachment to climber and the rope end 18 is for attachment to belayer. The rope grab usually has a further plate 13 (control plate) and the brake plate 10 and the further plate are arranged within the rope grab 100 in such a manner that the rope 50 can be fed into the rope grab 100 from the direction of the belayer (slack strand) via the further plate 13, is guided onto the first section 1 of the brake plate and is deflected at the brake plate 10 to exit the rope grab 100 in the direction of the climber (load strand).

The first arc and the second arc can be arranged adjacent to each other and are preferably connected by a tangent 25a, 25c.

Figure 4:
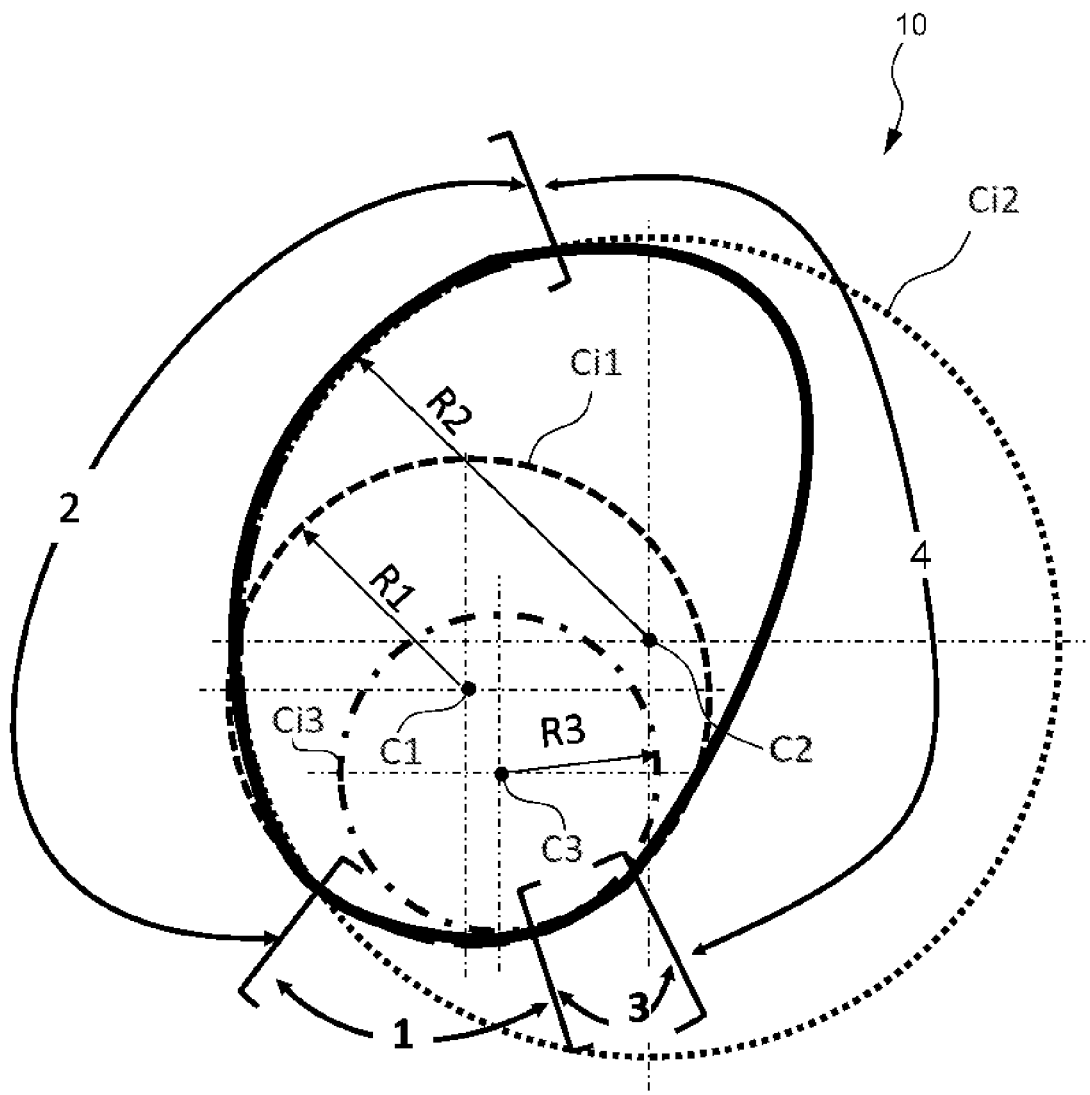
FIG. 4 shows the brake plate 10 according to the invention in a preferred embodiment.

As shown in FIG. 4 in a preferred embodiment, the brake plate 10 can further comprise a third section 3 for supporting the rope 50 on the brake plate 10, wherein the third section 3 is a third arc of a third circle Ci3 having a third radius R3, wherein the third section 3 is arranged adjacent the first section 1 and wherein the third radius R3 is smaller than the first radius R1 and the second radius R2, respectively, wherein for the effectiveness of the brake plate, the ratio of the second radius to the first radius to the third radius is particularly preferably (approximately) 1 to ½ to ⅓.

The third section 3 can be a section of the surface of the brake plate 10, and the first section 1 can be located downstream of (and adjacent to) the third section 3 as viewed from the slack strand 18 of the rope to the load strand 11 of the rope 50. The first arc and the third arc can be arranged adjacent to each other and are preferably connected by a tangent.

The first section 1, the second section 2 and optionally the third section 3 can be referred to as the front side of the brake plate 10, while the fourth section 4 shown in FIGS. 2 to 6B can be referred to as the rear side of the brake plate 10. The shape of section 4 can be arbitrary. The rope 50 runs into the rope grab 100, optionally without contacting the fourth section 4, and runs out of the rope grab 100 via the sections 1, 2 and optionally 3 of the brake plate 10 on which the rope 50 rests.

In each of the embodiments described by FIGS. 2 to 6B, the centers C1, C2 and C3, respectively, of the circles Ci1, Ci2 and Ci3, respectively, can be arranged spatially separated from each other. The arrangements of the center points shown in the figures are examples but not essential to the invention.

Figure 5:
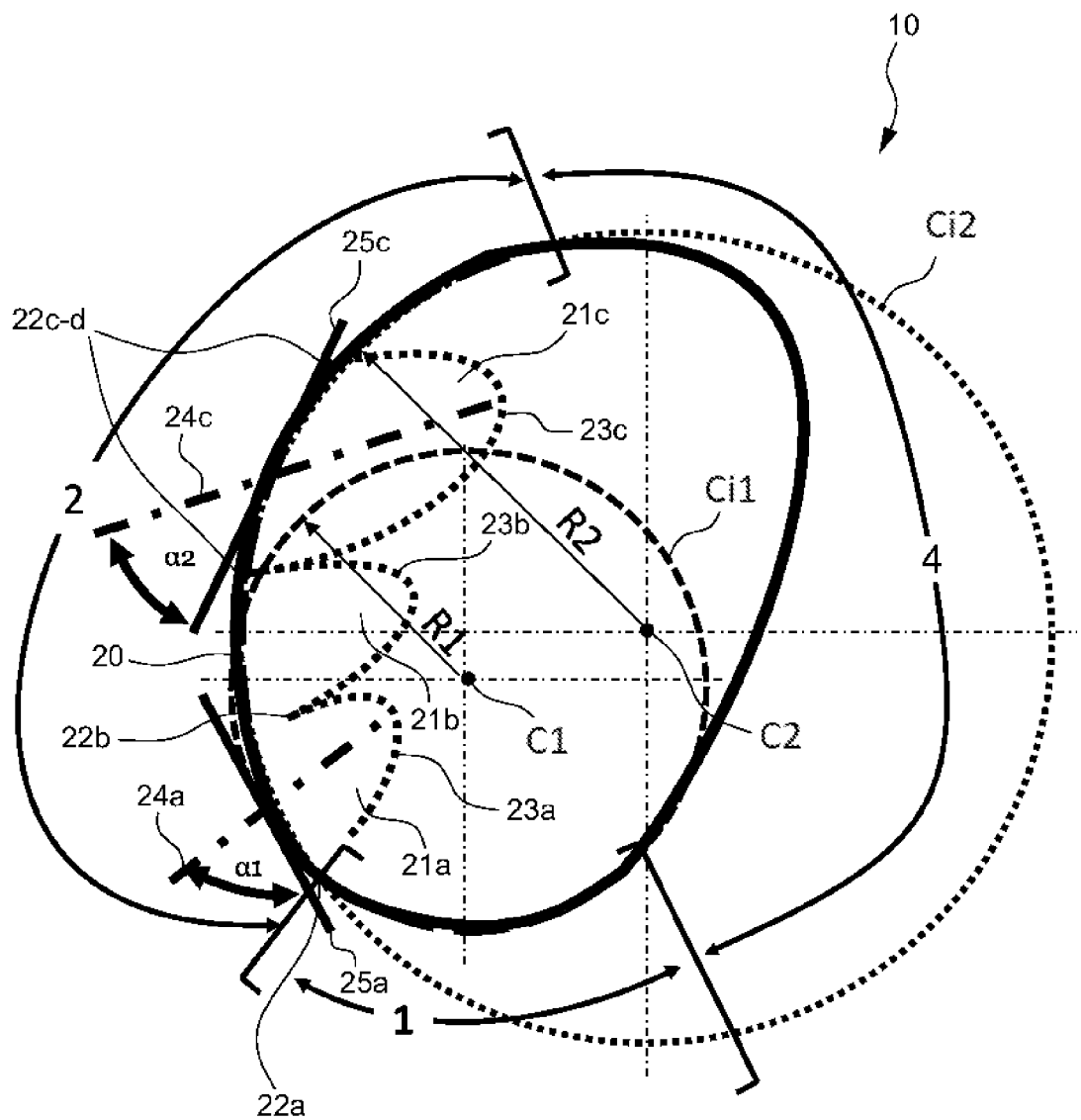
FIG. 5 shows the brake plate 10 according to the invention in a preferred embodiment of the brake plate 10 as shown in FIG. 3.
Figure 6B:
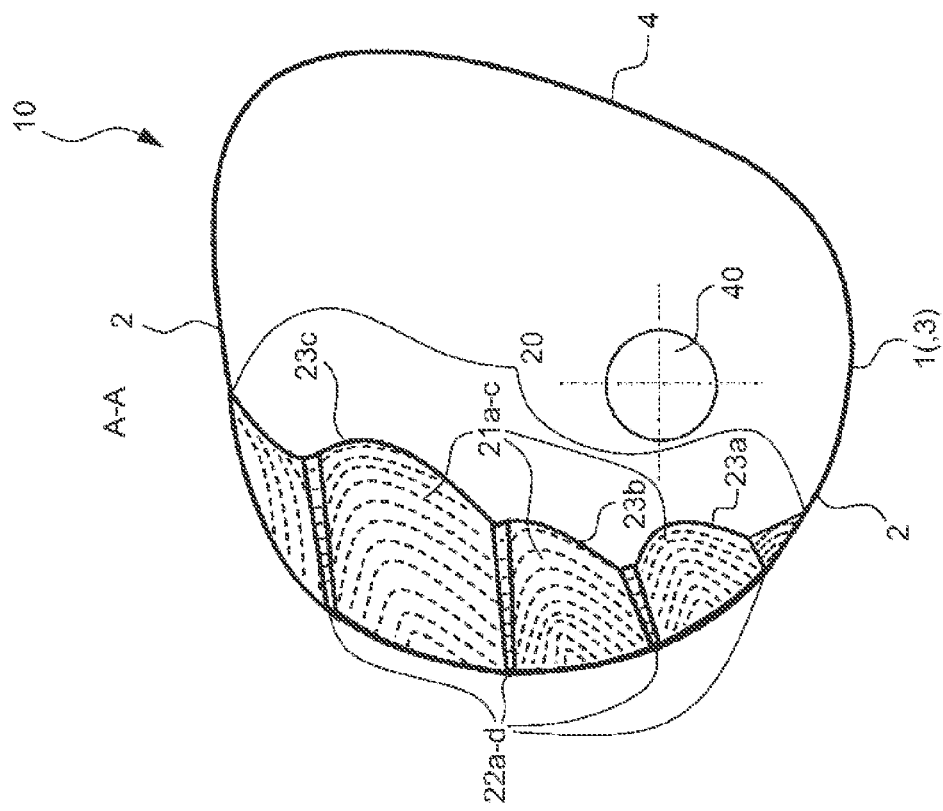
FIG. 6B shows a vertical section through the embodiment of the brake plate according to the invention in the preferred embodiment according to FIG. 2A along the axis A-A shown in FIG. 2A.

In any of the embodiments described by FIGS. 2 to 4, the second section 2 can be a section of the surface of the brake plate 10 and can have a rope channel 20 with a wave-like contour, as also shown and described in FIGS. 5 to 6B.

FIG. 5 shows the brake plate 10 according to the invention as shown in FIG. 3, additional with rope channel 20.

Figure 6A:
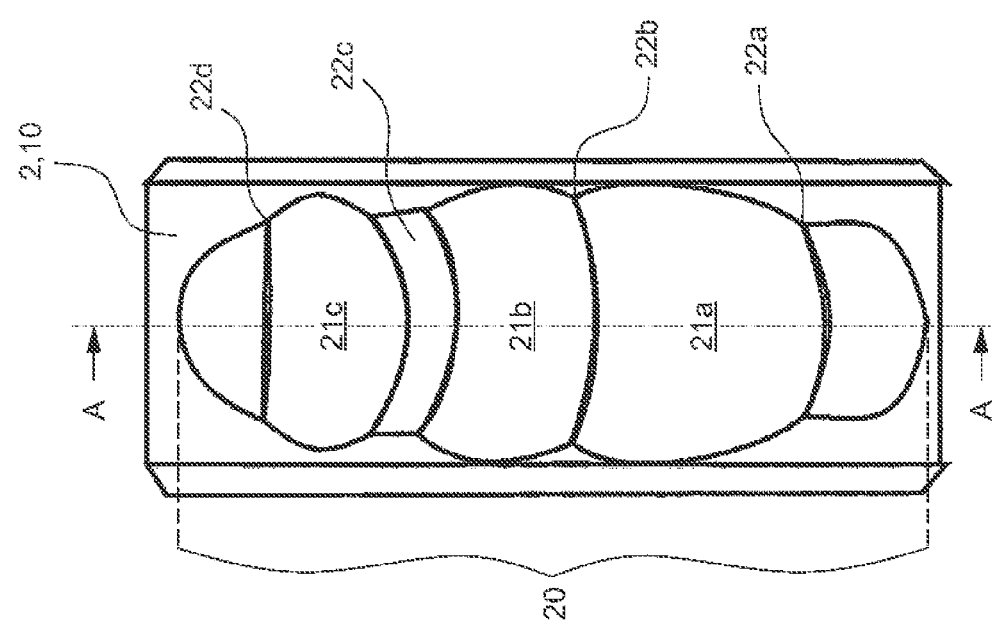
FIG. 6A shows a front view of the brake plate 10 according to the invention in the preferred embodiment as shown in FIG. 5.

FIG. 6A shows a front view of the brake plate 10 according to the invention in the preferred embodiment according to FIG. 5. FIG. 6B shows a vertical section through the embodiment of the brake plate according to the invention in the preferred embodiment according to FIG. 2A along axis A-A shown in FIG. 2A.

As shown in FIGS. 5 to 6B, the rope channel 20 can have one or more (any number of) recesses 21a, 21b, 21c on the surface of the brake plate 10, wherein each of the recesses 21a, 21b, 21c can be delimited by two constrictions 22a, 22b, 22c, 22d. The rope channel 20 can further include one or more recesses which are delimited by a constriction 22a, 22d on one side only and which end in the surface of section 2 of the brake plate 10 at another end.

The one or more recesses 21a, 21b, 21c with the respective constrictions 22a, 22b, 22c, 22d arranged adjacent thereto can be adapted here in such a manner that, when loaded, the rope structure or the sheath of the rope 50 supported in the rope channel 20 is compressed and the section of the rope 50 with the compressed rope structure or the compressed rope sheath is pressed into one or more of the recesses 21a, 21b, 21c.

In this case, the one or more recesses 21a, 21b, 21c can comprise a first recess 21a, 21b and a second recess 21b, 21c, wherein, as viewed from the slack strand 18 of rope 50 to the load strand 11 of rope 50, the second recess 21b, 21c is arranged downstream of and preferably adjacent to the first recess 21a, 21b (as in the case of recess 21b with respect to recess 21a or in the case of recess 21c with respect to recess 21b) on the surface of the brake plate 10, and between the first recess 21a, 21b and the second recess 21b, 21c there is one (22b or 22c) of the constrictions 22a, 22b, 22c, 22d which delimits the first recess 21a from the second recess 21b, 21c.

On the side of each of the constrictions 22a, 22b, 22c, 22d facing the slack strand 18 of the rope 50, the rope 50 can run onto the constriction, and on the side of each of the constrictions 22a, 22b, 22c, 22d facing the load strand 11 of the rope 50 it can run off the constriction.

The one or more recesses 21a, 21b, 21c with the respective constrictions 22a, 22b, 22c, 22d arranged adjacent thereto can be adapted here in such a manner that, when loaded, the rope structure or the sheath of the rope 50 supported in the rope channel 20 is more compressed within a first one of the recesses 21a, 21b, 21c and the compressed rope 50 is more pressed or pulled into the recess than within a second one of the recesses 21a, 21b, 21c.

When the climber falls, the rope 50 is pulled into the wave-like rope channel 20. Due to friction on the flanks of the one or more recesses in the rope channel 20, the rope structure is deformed or compressed or the rope sheath is pushed back or compressed with respect to the rope core. The section of the rope 50 with a deformed rope structure or a pushed-back or compressed rope sheath is pressed into one or more of the recesses 21a-c in the rope channel and thereby increases the frictional force acting on the rope 50.

Both the contour 23a of the first recess 21a and the contour 23b, 23c of the second recess 21b, 21c can each have the shape of a surface section of an ellipsoid, wherein a first angle α1 is given between a major axis 24a of the ellipsoid of the first recess 21a and a tangent 25a to the second circular arc in the region of the first recess 21a, wherein a second angle α2 is given between a major axis 24c of the ellipsoid of the second recess 21c and a tangent 25c to the second circular arc in the region of the second recess 21c, and wherein the first angle α1 is greater than the second angle α2, wherein for the effectiveness of the brake plate, the first angle and the second angle are each particularly preferably between 10° and 90°.

Since the major axes 24a, 24c run parallel to one another, the angle α between the tangent 25a, 25c and the major axis 24a, 24c changes in such a manner that the slope which the constrictions 22a-d present to the incoming rope 50 is initially steep and then becomes increasingly shallower and as a result, the rope 50 is initially pressed strongly into the respective recess 21a-c along the second section 2 in the direction from the slack strand to the load strand and then, as viewed in the direction of the load strand, is drawn less and less into the respective recess 21a-c. When the rope 50 is under load, this results in an increased frictional force acting on the rope 50. If the rope 50 is free of load, however, this allows the rope 50 to be freely lifted out of the rope channel 20 again.

In this regard, the rope grab 100 according to the invention for rope climbing is characterized in that the rope grab 100 comprises the brake plate 10 according to any one of the embodiments described herein.

The method according to the invention is for retrofitting a rope grab brake 100, wherein the rope grab 100 comprises a fastening means 30 (e.g., a screw) for a brake plate, the method comprising: fixing the brake plate 10 according to the invention according to any one of the embodiments described herein to the fastening means 30. The brake plate according to the invention can comprise an opening 40 for fixing to the fastening means 30. The brake plate according to the invention can be manufactured from a metal.

The numerical values mentioned herein are examples but not essential to the invention.

The detailed description and the drawings describe preferred embodiments of the invention given by the following claims. For carrying out the invention given herein according to the appended claims, the (optional or preferred) features disclosed in the foregoing description, claims and drawings can be used both individually and in any combination in configurations of the invention.

The invention claimed is:

1. A brake plate for a rope grab for rope climbing, the brake plate comprising:
   a first section for supporting a rope on the brake plate, wherein the first section is a first arc of a first circle having a first radius; and
   a second section for supporting the rope on the brake plate, wherein the second section is arranged adjacent to the first section; wherein the brake plate is configured such that
   the second section is a second arc of a second circle having a second radius, wherein the second radius is greater than the first radius,
   the second section is a section of a surface of the brake plate and has a rope channel with a wavelike contour,
   the rope channel has one or more recesses on the surface of the brake plate, wherein each of the recesses is delimited by two constrictions,
   the one or more recesses comprise a first recess and a second recess, wherein, as viewed from a slack strand of the rope to a load strand of the rope, the second recess is arranged downstream of the first recess on the surface of the brake plate, and between the first recess and the second recess there is one of the constrictions which delimits the first recess from the second recess, and both the contour of the first recess and the contour of the second recess each have the shape of a surface portion of an ellipsoid, wherein a first angle is given between a major axis of the ellipsoid of the first recess and a tangent to the second arc in the region of the first recess, wherein a second angle is given between a major axis of the ellipsoid of the second recess and a tangent to the second arc in the region of the second recess, and wherein the first angle is greater than the second angle.

2. The brake plate according to claim 1, wherein the first section and the second section are sections of the surface of the brake plate, and the second section is arranged downstream of the first section as viewed from the slack strand of the rope to the load strand of the rope.

3. The brake plate according to claim 1, wherein the first arc and the second arc are arranged adjacent to each other and are connected to each other by a tangent.

4. The brake plate according to claim 1, wherein the brake plate further comprises a third section for supporting the rope on the brake plate, wherein the third section is a third arc of a third circle having a third radius, wherein the third section is arranged adjacent to the first section and wherein the third radius is smaller than the first radius.

5. The brake plate according to claim 4, wherein the third section is a section of the surface of the brake plate and the first section is arranged downstream of the third section as viewed from the slack strand of the rope to the load strand of the rope.

6. The brake plate according to claim 1, wherein the centers of the circles are arranged spatially separated from each other.

7. The brake plate according to claim 1, wherein the one or more recesses with the respective adjacent constrictions are adapted such that when loaded, a rope structure or a sheath of the rope supported in the rope channel is compressed and the section of the rope with the compressed rope structure or the compressed rope sheath is pressed into one or more of the recesses.

8. The brake plate according to claim 1, wherein the rope runs onto the constriction on the side of each of the constrictions facing the slack strand of the rope and runs off the constriction on the side of each of the constrictions facing the load strand of the rope.

9. The brake plate according to claim 7, wherein the one or more recesses with the respective adjacent constrictions are adapted such that when loaded, the rope structure or the sheath of the rope supported in the rope channel is compressed more within a first one of the recesses and the compressed rope is pressed more into the recess than within a second one of the recesses.

10. A rope grab for rope climbing, the rope grab comprising:
a brake plate, the brake plate comprising:
a first section for supporting a rope on the brake plate, wherein the first section is a first arc of a first circle having a first radius; and
a second section for supporting the rope on the brake plate, wherein the second section is arranged adjacent to the first section;
wherein the brake plate is configured such that
the second section is a second arc of a second circle having a second radius, wherein the second radius is greater than the first radius,
the second section is a section of a surface of the brake plate and has a rope channel with a wavelike contour,
the rope channel has one or more recesses on the surface of the brake plate, wherein each of the recesses is delimited by two constrictions,
the one or more recesses comprise a first recess and a second recess, wherein, as viewed from a slack strand of the rope to a load strand of the rope, the second recess is arranged downstream of the first recess on the surface of the brake plate, and between the first recess and the second recess there is one of the constrictions which delimits the first recess from the second recess, and
both the contour of the first recess and the contour of the second recess each have the shape of a surface portion of an ellipsoid, wherein a first angle is given between a major axis of the ellipsoid of the first recess and a tangent to the second arc in the region of the first recess, wherein a second angle is given between a major axis of the ellipsoid of the second recess and a tangent to the second arc in the region of the second recess, and wherein the first angle is greater than the second angle.

11. A method for retrofitting a rope grab, wherein the rope grab comprises a fastening means for a brake plate, the method comprising:
fixing the brake plate to the fastening means,
the brake plate comprising:
a first section for supporting a rope on the brake plate, wherein the first section is a first arc of a first circle having a first radius, and
a second section for supporting the rope on the brake plate, wherein the second section is arranged adjacent to the first section,
wherein the brake plate is configured such that
the second section is a second arc of a second circle having a second radius, wherein the second radius is greater than the first radius,
the second section is a section of a surface of the brake plate and has a rope channel with a wavelike contour,
the rope channel has one or more recesses on the surface of the brake plate, wherein each of the recesses is delimited by two constrictions,
the one or more recesses comprise a first recess and a second recess, wherein, as viewed from a slack strand of the rope to a load strand of the rope, the second recess is arranged downstream of the first recess on the surface of the brake plate, and between the first recess and the second recess there is one of the constrictions which delimits the first recess from the second recess, and
both the contour of the first recess and the contour of the second recess each have the shape of a surface portion of an ellipsoid, wherein a first angle is given between a major axis of the ellipsoid of the first recess and a tangent to the second arc in the region of the first recess, wherein a second angle is given between a major axis of the ellipsoid of the second recess and a tangent to the second arc in the region of the second recess, and wherein the first angle is greater than the second angle.

* * * * *